Figure 1:
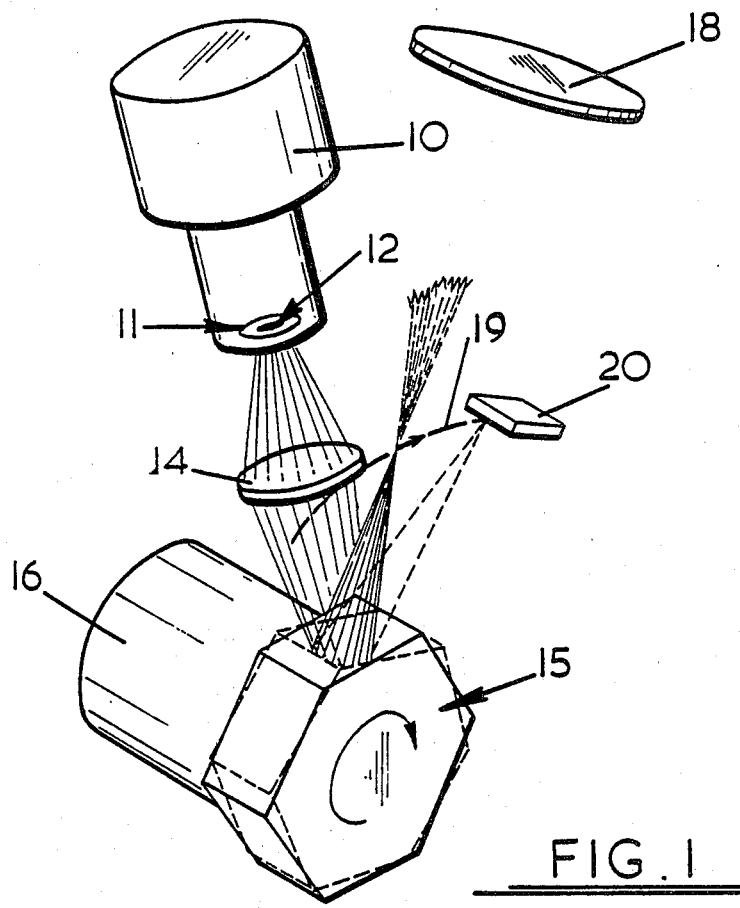

United States Patent [19]

Berry

[11] 4,296,325
[45] Oct. 20, 1981

[54] SCANNING MIRROR POSITION SYSTEM

[75] Inventor: Peter J. Berry, Glasgow, Scotland

[73] Assignee: Barr & Stroud Limited, Glasgow, Scotland

[21] Appl. No.: 128,551

[22] Filed: Mar. 10, 1980

[51] Int. Cl.³ .............................................. G01J 1/00
[52] U.S. Cl. .................................... 250/347; 250/338
[58] Field of Search ................ 250/338, 340, 347, 353

[56] References Cited

U.S. PATENT DOCUMENTS 3,350,562  10/1967  Flint .................................... 250/347
4,152,588   5/1979  Klatt et al. ....................... 250/347 X Primary Examiner—Davis L. Willis
Attorney, Agent, or Firm—Mason, Fenwick & Lawrence

[57] ABSTRACT

A radiation scanning system comprises a detector 12 which forms part of an assembly 11 maintained at a temperature substantially below ambient, an imaging means 18 for forming an image of radiation from a field of view, a scan member 15 and a relay lens 14 arranged to scan an image of the detector 12 across the radiation image and an arrangement for applying a characteristic radiation feature to the detector 12 at a selected part of the detector image locus 19 lying outside the normal scanned field of the system comprises a mirror 20 arranged to reflect radiation from the cooled assembly 11 onto the detector 12.

2 Claims, 2 Drawing Figures

U.S. Patent   Oct. 20, 1981   4,296,325

SCANNING MIRROR POSITION SYSTEM

This invention relates to a radiation scanning system and is an improvement in or modification of the invention disclosed in our U.K. Patent Specification No. 1530792.

U.K. Patent Specification No. 1530792 discloses a radiation scanning system including a radiation detector, a radiation-imaging means for forming an image of radiation from a field of view, a scan member and a relay lens arranged to scan an image of the detector across the radiation image, and an arrangement for applying a characteristic radiation feature to the detector at a selected part of the detector image locus lying outside the normal scanned field of the system. Such a system will be referred to hereinafter as 'of the type aforesaid'.

We have now found that, where the radiation detector forms part of an assembly maintained at a temperature substantially below ambient the radiation from this assembly can be utilised in the aforesaid manner for the purpose of generating a synchronising signal.

According to the present invention there is provided a radiation scanning system of the type aforesaid wherein the radiation detector forms part of an assembly maintained at a temperature substantially below ambient, and said means for applying radiation of predetermined character to the detector includes a mirror located on the scan locus of the detector image and arranged to reflect radiation from the cooled assembly onto the detector.

Figure 2:
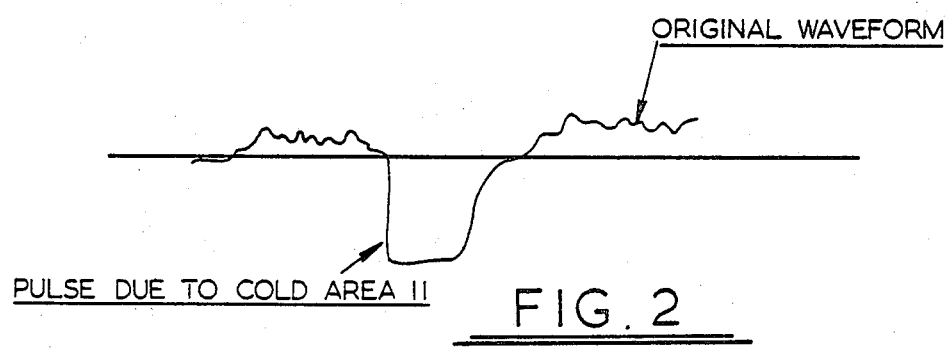

An embodiment of the present invention will now be described by way of example with reference to the accompanying drawing, in which:

FIG. 1 illustrates a radiation scanning system according to the present invention; and FIG. 2 illustrates a waveform produced by the detector.

In the drawings, there is shown a detector assembly 10 which has a cold area 11 in the neighbourhood of detector elements 12 which together constitute the detector of the system. The cold area 11 is significantly below ambient temperature for the purpose of maintaining the detector elements 12 sensitive to infra-red radiation, as is known per se. The system further includes a relay or transfer lens 14 and a scan member 15 driven by an electric motor 16 whereby radiation from a field of view and imaged by a lens 18 is relayed or transferred onto the detector elements 12. The image of the detector in effect forms a locus 19 and on this locus there is located a mirror 20 at a position laterally outside the normal scanned field of the system as determined, for example, by the lens 18. The mirror 20 is so arranged that radiation from the cold area 11 of the assembly 10 is reflected onto the detector elements 12 at the selected part of the detector image locus in order to provide a synchronisation signal.

Since the area 11 is cold the waveform produced by the detector includes a negative pulse. The edge of the mirror may be used to provide a rapidly changing signal but if further discrimination is required the mirror 20 can have strips of varying emissivity such that a readily identifiable pattern is superimposed on the scene information. For example if the pattern consists of two reflective strips placed a known distance apart, the pulse due to the first strip can be used to open a gate after a predetermined time delay so that triggering only takes place if a second pulse appears at the appropriate time.

The present invention is applicable to scanning systems where in effect a real image of the detector is formed at an accessible locus and may be used with separate line and frame scan systems. Conveniently the invention is utilised in the line scanner between the two scanning mechanisms because this provides identical synchronisation signals for all scanned lines.

What is claimed is:

1. A radiation scanning system including a radiation detector, a radiation-imaging means for forming an image of radiation from a field of view, a scan member and a relay lens arranged to scan an image of the detector across the radiation image, and an arrangement for applying a characteristic radiation feature to the detector at a selected part of the detector image locus lying outside the normal scanned field of the system, wherein the radiation detector forms part of an assembly maintained at a temperature substantially below ambient, and said means for applying a characteristic radiation feature to the detector includes a mirror located on the scan locus of the detector image of the system and arranged to reflect radiation from the cooled assembly onto the detector.

2. A radiation scanning system as claimed in claim 1, wherein the reflective surface of the mirror has strips of different emissivity.

* * * * *